United States Patent
Maheshwari et al.

(10) Patent No.: US 12,101,376 B2
(45) Date of Patent: Sep. 24, 2024

(54) SCALABLE REQUEST AUTHORIZATION

(71) Applicant: Intuit Inc., Mountain View, CA (US)

(72) Inventors: Sachin Kumar Maheshwari, Bengaluru (IN); Bala Dutt, Bengaluru (IN); Ravi Kumar Chauhan, Bengaluru (IN); Thomas Ryan Barnes, Poway, CA (US); Snezana Sahter, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 45 days.

(21) Appl. No.: 17/161,579

(22) Filed: Jan. 28, 2021

(65) Prior Publication Data

US 2022/0239733 A1    Jul. 28, 2022

(51) Int. Cl.
*H04L 67/1074* (2022.01)
*G06F 18/214* (2023.01)
*G06N 20/00* (2019.01)
*H04L 9/40* (2022.01)

(52) U.S. Cl.
CPC ........ *H04L 67/1076* (2013.01); *G06F 18/214* (2023.01); *G06N 20/00* (2019.01); *H04L 63/0876* (2013.01); *H04L 67/1078* (2013.01)

(58) Field of Classification Search
CPC ............. H04L 67/1076; H04L 63/0876; H04L 67/1078; G06N 20/00; G06K 9/6256
USPC ...................................................... 709/223
See application file for complete search history.

(56) References Cited

U.S. PATENT DOCUMENTS

| | | | | |
|---|---|---|---|---|
| 2011/0271321 A1* | 11/2011 | Soppera | ................ | G06F 21/604 726/1 |
| 2013/0047195 A1* | 2/2013 | Radhakrishnan | ..... | H04L 63/105 726/1 |
| 2017/0223057 A1* | 8/2017 | Amiri | ................... | H04L 67/306 |
| 2018/0089556 A1* | 3/2018 | Zeiler | ................. | G06N 3/0454 |
| 2018/0288063 A1* | 10/2018 | Koottayi | ................ | G06F 15/76 |
| 2021/0306377 A1* | 9/2021 | Kundu | .................... | H04L 41/22 |
| 2022/0058342 A1* | 2/2022 | Fan | .......................... | G06N 5/04 |
| 2022/0405580 A1* | 12/2022 | Zheng | ............... | G06F 18/24147 |

FOREIGN PATENT DOCUMENTS

CN          113169982 B   * 11/2022  ........... G06F 16/951

* cited by examiner

*Primary Examiner* — Wing F Chan
*Assistant Examiner* — John Fan
(74) *Attorney, Agent, or Firm* — Lathrop GPM LLP

(57) ABSTRACT

A method scalably authorizes requests. A request to authorize access to a resource is received. A plurality of policies controlling the request is identified. The plurality of policies are concurrently processed. A decision for a policy is received. The decision is of a plurality of decisions corresponding to the plurality of policies. The policy is of the plurality of policies. The decision is determined using a machine learning model and the request. An aggregate decision is generated from the plurality of decisions. A token to access the resource is transmitted in response to the aggregate decision.

16 Claims, 10 Drawing Sheets

SCALABLE REQUEST AUTHORIZATION

BACKGROUND

Requests for resources (e.g., files) on a computer network are authorized to ensure that the recess is resources are being accessed by authorized devices for authorized purposes. Some requests may be anomalous and related to unauthorized activity. A challenge is to prevent anomalous requests while handling a large volume of requests in a scalable manner.

SUMMARY

In general, in one or more aspects, the disclosure relates to a method that scalably authorizes requests. A request to authorize access to a resource is received. A plurality of policies controlling the request is identified. The plurality of policies are concurrently processed. A decision for a policy is received. The decision is of a plurality of decisions corresponding to the plurality of policies. The policy is of the plurality of policies. The decision is determined using a machine learning model and the request. An aggregate decision is generated from the plurality of decisions. A token to access the resource is transmitted in response to the aggregate decision.

In general, in one or more aspects, the disclosure relates to a system that includes a server and an authorization application. The server includes one or more processors and one or more memories. The authorization application executes on one or more processors of the server. A request to authorize access to a resource is received. A plurality of policies controlling the request is identified. The plurality of policies are concurrently processed. A decision for a policy is received. The decision is of a plurality of decisions corresponding to the plurality of policies. The policy is of the plurality of policies. The decision is determined using a machine learning model and the request. An aggregate decision is generated from the plurality of decisions. A token to access the resource is transmitted in response to the aggregate decision.

In general, in one or more aspects, the disclosure relates to a method that trains and uses machine learning models or scalable request authorization. A request anomaly model of a machine learning model is trained using training request data. A velocity anomaly model of the machine learning model is trained using a training request stream and a training decision stream. A request to authorize access to a resource is received. a plurality of policies controlling the request is identified. The plurality of policies are concurrently processed. A decision for a policy is received. The decision is of a plurality of decisions corresponding to the plurality of policies. The policy is of the plurality of policies. The decision is determined using the machine learning model and the request. An aggregate decision is generated from the plurality of decisions. a token to access the resource is transmitted in response to the aggregate decision.

Other aspects of the invention will be apparent from the following description and the appended claims.

DETAILED DESCRIPTION

Figure 1A:
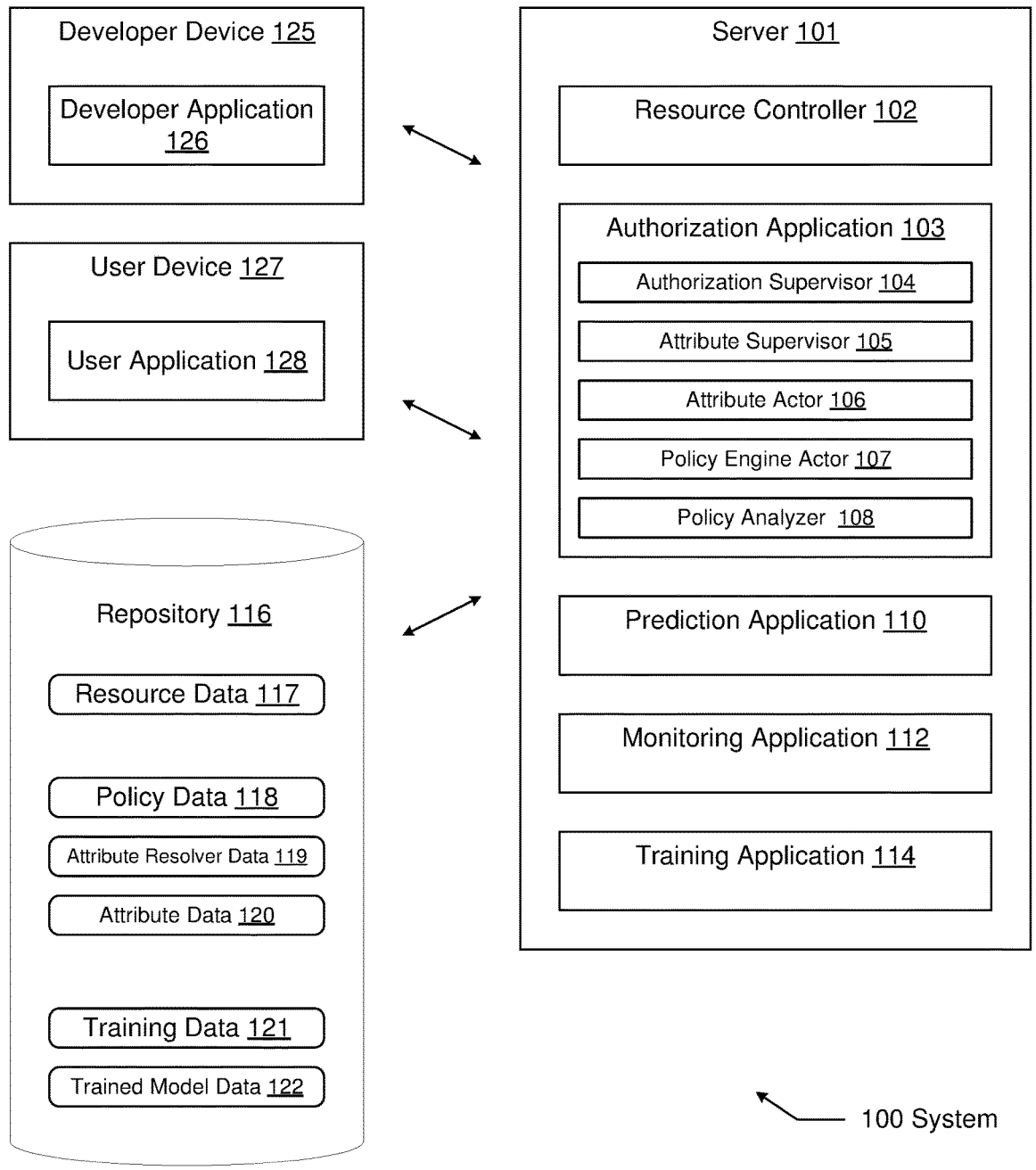
FIG. 1A, FIG. 1B, FIG. 1C, and FIG. 1D show diagrams of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure handle request authorization in a scalable manner using machine learning models to identify anomalous requests. A request for a resource is received and processed without blocking processes authorizing other requests. The system uses a messaging infrastructure to prevent the programs of the system from blocking each other. The policy's controlling authorization of a request are identified by a system and the attributes used to process the policies are also identified. The attributes are retrieved with attribute resolvers, and then the policies for the request are executed to determine if the request is permitted or denied. Multiple policies may require the use of machine learning models. The system may use a request anomaly model and may use a velocity anomaly model to determine if a particular request is an anomaly. The request anomaly model uses information extracted from the request itself to determine if the request is an anomaly. The velocity anomaly model uses information about similar requests overtime to determine if the request is anomalous. When either the request anomaly model or the velocity anomaly model determined that a request is anomalous, the system may deny the request. Additionally, the other policies executed to determine authorization for a request may also deny the request.

A request for accessing a resource identifies a resource, a subject, an action, and an environment. The resource may be identified with a URI (uniform resource indicator) that identifies a file or system being accessed. The subject identifies the process (e.g., the actor (user/application/device/account)) making the request and may be identified with system wide unique identifiers and attributes like roles etc. The action identifies the action to be performed with the resource by the subject and may be identified with verbs like create, read, write, delete, update, send, print etc. The environment identifies a context of the request and may be identified with time (which may include a date), location (region, country, city, etc.), internet protocol (IP) address, flavor of the product, product, type of device (browser, desktop, mobile app (iOS, android, etc.), tablet), etc.

Figure 1B:
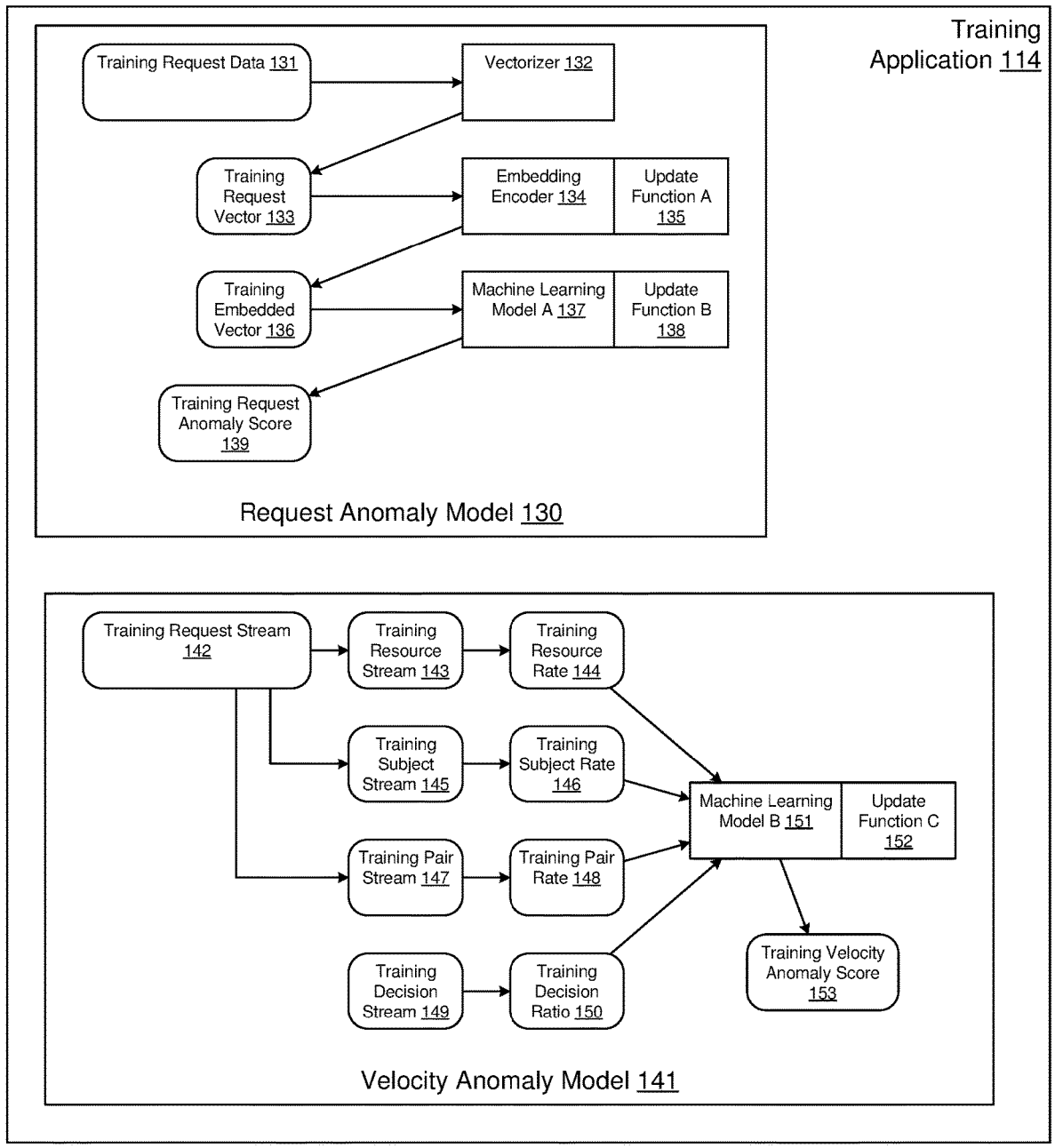
Figure 1C:
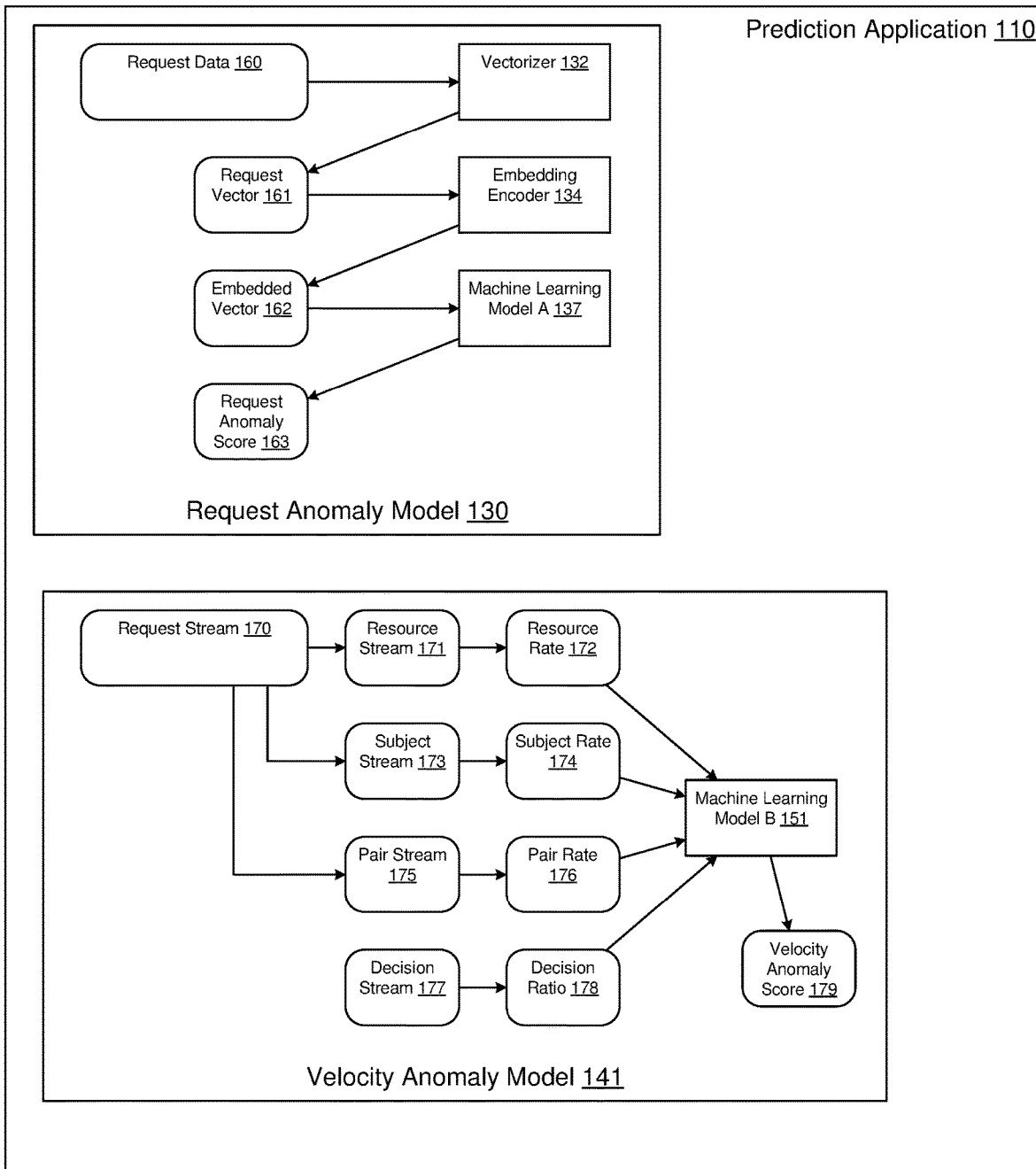
Figure 1D:
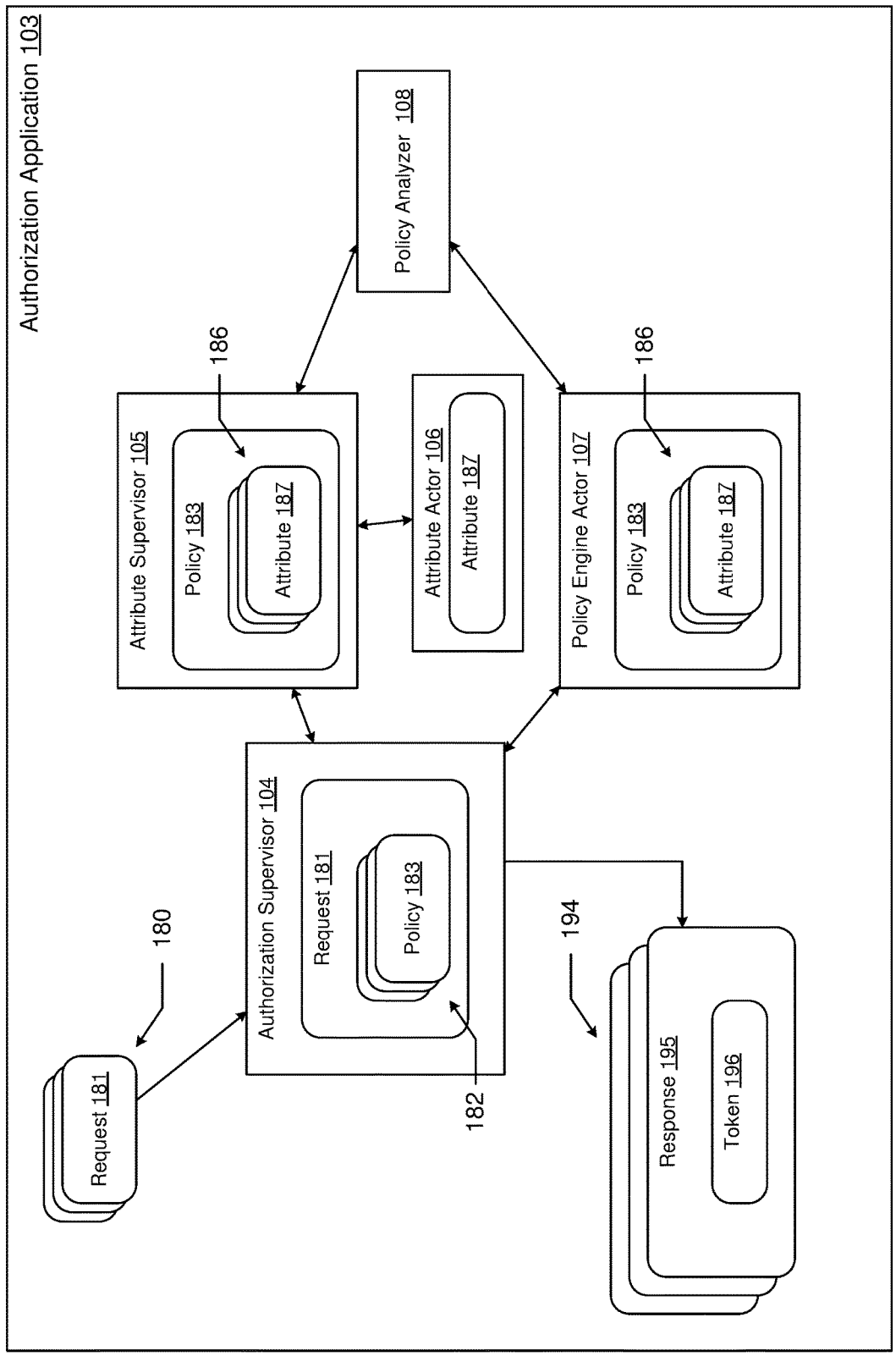

FIGS. 1A, 1B, 1C, and 1D show diagrams of embodiments that are in accordance with the disclosure. FIG. 1A shows a system (100), which performs scalable request authorization. FIG. 1B shows the training application (114), which trains machine learning models to authorize requests. FIG. 1C shows the prediction application (110), which uses the trained machine learning models to predict anomalies. FIG. 1D shows the authorization application (103), which generates responses to authorization requests. The embodiments of FIGS. 1A, 1B, 1C, and 1D may be combined and may include or be included within the features and embodiments described in the other figures of the application. The features and elements of FIGS. 1A, 1B, 1C, and 1D are, individually and as a combination, improvements to the technology of machine learning and request authorization. The various elements, systems, and components shown in FIGS. 1A, 1B, 1C, and 1D may be omitted, repeated, combined, and/or altered as shown from FIGS. 1A, 1B, 1C, and 1D. Accordingly, the scope of the present disclosure should not be considered limited to the specific arrangements shown in FIGS. 1A, 1B, 1C, and 1D.

Turning to FIG. 1A, the system (100) performs scalable request authorization. The system (100) includes the server (101), the repository (116), the developer device (125), and the user device (127).

Figure 5A:
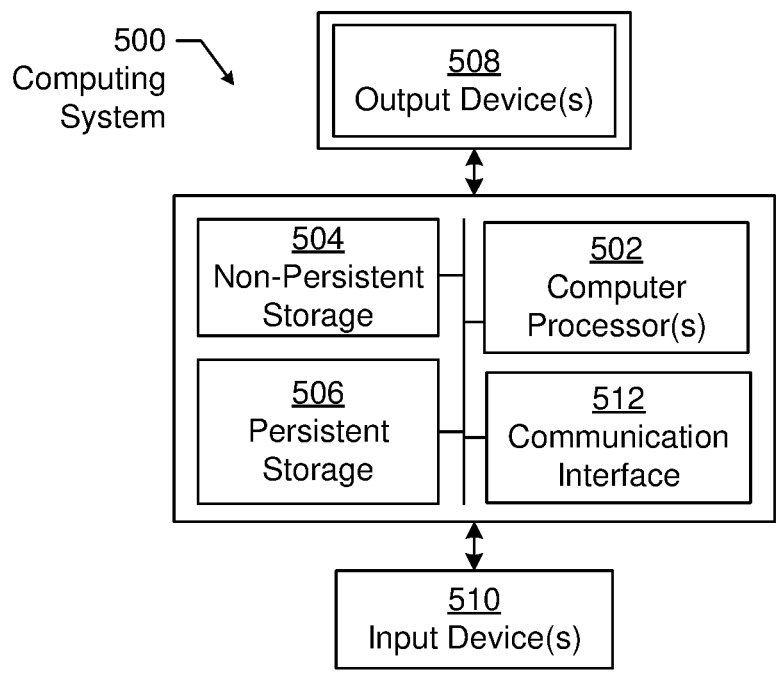
FIG. 5A and FIG. 5B show computing systems in accordance with disclosed embodiments.
Figure 5B:
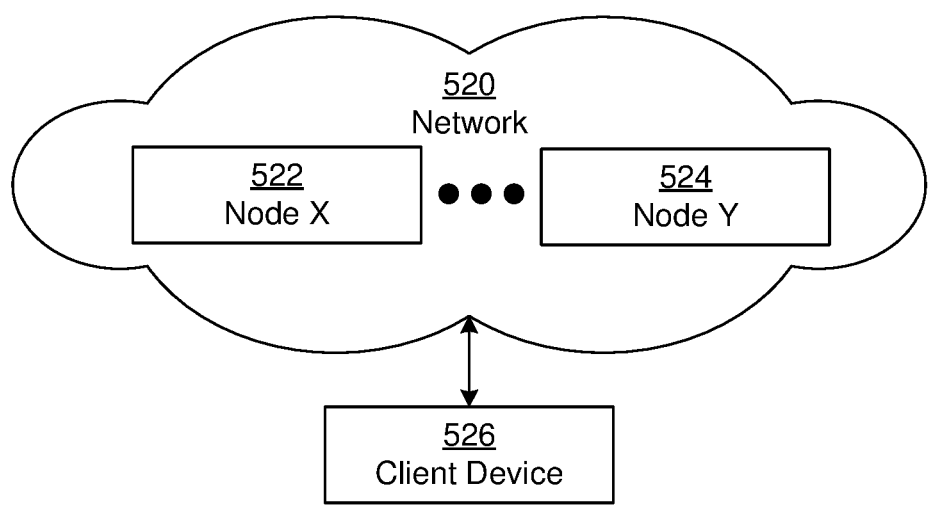

The server (101) is an embodiment of the computing system (500) and the nodes (522) and (524) of FIG. 5A and FIG. 5B and communicates with the developer device (125), the user device (127) and the repository (116). The server (101) may be one of a set of virtual machines hosted by a cloud services provider to deploy the resource controller (102), the authorization application (103), the prediction application (110), the monitoring application (112), and the training application (114). Each of the programs running on the server (101) may execute inside one or more containers hosted by the server (101) using one or more processors and one or more memories.

The resource controller (102) is a computer implemented program that controls access to a resource that is requested by the user device (127). The resource controller (102) receives requests from the user device (127) that are passed to the authorization application (103). Individual requests may be part of a batch of requests.

The authorization application (103) is a computer implemented program that authorizes the requests received by and from the resource controller (102). The programs of the authorization application (103) may communicate with each other by passing messages to prevent the processing threads, which execute the programs, from being blocked by each other. The authorization application includes the authorization supervisor (104), the attribute supervisor (105), the attribute actor (106), the policy engine actor (107), and the policy analyzer (108), which are further described with FIG. 1D.

The prediction application (110) is a computer implemented program that predicts anomalies within the system (100). The prediction application (110) is further described with FIG. 1C.

The monitoring application (112) is a computer implemented program that monitors the data flowing through the system and may save request data and authorization data as the training data (121) for training machine learning models. The monitoring application (112) may also gather resource data (117) that is stored in the repository (116) and input to the prediction application (110).

The training application (114) is a computer implemented program that trains machine learning models used by the prediction application (110). The training application (114) is further described with FIG. 1C.

The repository (116) is a computing system that may include multiple computing devices in accordance with the computing system (500) and the nodes (522) and (524) described below in FIGS. 5A and 5B. The repository (116) may be hosted by a cloud services provider. The cloud services provider may provide hosting, virtualization, and data storage services as well as other cloud services and to operate and control the data, programs, and applications that store and retrieve data from the repository (116). The data in the repository (116) may include the resource data (117), the policy data (118), the attribute resolver data (119), the attribute data (120), the training data (121), and the trained model data (122).

The resource data (117) includes files and information controlled with the resource controller (102). For example, the resource data may include financial account information.

The policy data (118) includes the policies used by the system (100). The policies define the rules for accessing the resource data (117). The rules of a policy may identify a minimum set of user credentials, time periods for which access is allowed, mappings between users and resources that are allowed, etc.

The attribute resolver data (119) includes the code and data that define the attribute resolvers used by the system (100). An attribute resolver may be used by the attribute actor (106) to retrieve the attribute data (120). Examples of attribute data include: roles, permissions, location of the user, type of subject, type of resource, conditions or constraints applied on the subject or resource, etc. An attribute resolver may be written in JSON text, as shown in the example below.

```
{
    "name": "blogServiceResolver",
    "url": {
        "dev" :
        "https://dev.example.com/v1/blogs/$blogId$",
        "qal" :
        "https://qal.example.com/v1/blogs/$blogId$",
        "e2e" :
        "https://e2e.example.com/v1/blogs/$blogId$",
        "prf" :
        "https://prf.example.com/v1/blogs/$blogId$",
        "prd" : "https://prd.example.com/v1/blogs/$blogId$"
    },
    "method": "GET",
    "uriPathParameters": [
        {
            "key": "$blogId$",
            "value": "resource[blogId]"
        }
    ],
    "output": [
        {
            "key": "resource[createdBy]",
            "value": "createdBy"
        }
    ],
    "headers": [
        {
            "key": "Content-Type",
            "value": "application/json"
        },
        {
            "key": "company_tid",
```

-continued

```
        "value": "subject[company_tid]"
      }
    ]
  }
```

The attribute data (120) is the data used to resolve and execute the policies and rules of the policy data (118). The attribute data (120) may include user credential information, resource context information, resource access information, etc.

The training data (121) is the data used by the training application (114) to train the maternal machine learning models used by the system (100). The training data (121) includes historical requests and decisions for those requests. A request (either a live request or a training request) may be formatted as JSON (JavaScript object notation) text and identify several parameters related to the resource to which request access is being requested, the subject requesting the access, the action to be performed, and the environment for the context of the request.

The trained model data (122) is the data that defines the trained machine learning models of the system (100). The training application (114) stores the trained machine learning models as the trained model data (122).

The developer device (125) is an embodiment of the computing system (500) and the nodes (522) and (524) of FIG. 5A and FIG. 5B. In one embodiment, the developer device (125) is a desktop personal computer (PC). The developer device (125) includes the developer application (126) for accessing the training application (114). The developer application (126) may include a graphical user interface for interacting with the training application (114) to control training of the machine learning models of the system (100).

The user device (127) is an embodiment of the computing system (500) and the nodes (522) and (524) of FIG. 5A and FIG. 5B. In one embodiment, the user device (127) is a desktop personal computer (PC), a smartphone, a tablet, etc. The user device (127) is used to access the resource controlled by the resource controller (102). The user device (127) includes the user application (128) that accesses the resource controlled by the resource controller (102). The user application (128) may include multiple interfaces (e.g., graphical user interfaces) for interacting a resource. A user may operate the user application (128) to perform tasks that utilize the resources and the resource data controlled by the resource controller (102). The results may be presented by being displayed by the user device (127) in the user application (128).

The developer application (126) and the user application (128) may be web browsers that access the applications running on the server (101) using web pages hosted by the server (101). The developer application (126) and the user application (128) may additionally be web services that communicate with the applications running on the server (101) using representational state transfer application programming interfaces (RESTful APIs). Although FIG. 1D shows a client server architecture, one or more parts of the training application (114) and the server application (103) may be local applications on the developer device (125) and the user device (127) without departing from the scope of the disclosure.

Turning to FIG. 1B, the training application (114) trains the machine learning models used by the system (100). The training application (114) includes the request anomaly model (130) and the velocity anomaly model (141).

The request anomaly model (130) detects anomalies from the requests received by the system and is trained with the training request data (131). For training, the request anomaly model (130) may receive a historical request as part of the training request data (131) and generate the training request anomaly score (139). The historical request is a request that was previously received by the system (100) and stored to the training data (121) by the monitoring application (112) (shown in FIG. 1A). The request anomaly model (130) includes the vectorizer (132), the embedding encoder (134), and the machine learning model A (137).

The vectorizer (132) generates the training request vector (133) from the training request data (131). The training request data (131) includes historical requests (requests previously received by the system 100) that includes multiple components that may identify the resource, subject, action, and context. The components of a request are converted to training request vector (133) by the vectorizer (132). The training request vector (133) may be a high dimensional (e.g., (100) or more dimensions) sparse (few values, e.g., fewer than 10%, include a value other than "0") vector. As an example, the vectorizer (132) may map the English language words describing a request to individual integers that are mapped to one dimension of a high dimensional vector (e.g., thousands of dimensions, one for each word).

The embedding encoder (134) generates the training embedded vector (136) from the training request vector (133). The embedding encoder (134) transforms the input data into a series of numbers (a mathematical vector) to map the input data to a real number space. The training embedded vector (136) may have fewer dimensions (e.g., hundreds of dimensions) than the training request vector of (133) while representing the same request from the training request data (131). The embedding encoder may use a word2vec algorithm that uses the words describing a request as a sentence and attempts to predict the other words from a request given an input word from the request.

The embedding encoder (134) is updated with the update function A (135). The update function A (135) may use backpropagation to update a neural network in the embedding encoder (134). For example, the embedding encoder (134) may include an encoding function and a decoding function. The encoding function generates the training embedded vector (136) and the decoding function attempts to predict the training request vector (133) from the training embedded vector (136). The update function A (135) compares the prediction to the actual input to generate an error that is fed back into the weights of the no network of the embedded encoder (134).

The machine learning model A (137) generates the training request anomaly score (139) from the training embedded vector (136). The machine learning model A (137) may be updated with the update function B (138). The machine learning model A (137) may be an isolation forest model and the update function B (138) may execute an isolation forest algorithm. The isolation forest algorithm that separates anomalies of a dataset from the rest of the dataset. The isolation forest algorithm recursively generates partitions to the dataset (branches of an isolation tree) by randomly selecting an attribute (e.g., one of the dimensions from the training embedded vector (136)) from the elements of the data set and then randomly selecting a split value for the attribute, between the minimum and maximum values allowed for that attribute to form an isolation tree of rules.

Elements of the dataset that are anomalies will have shorter path lengths in the isolation tree compared to elements that are not anomalies. The training request anomaly score (139) may be a scalar value that indicates if the request from the training request data (131) is an anomaly and be proportional to a path length for reaching the training request vector (133) using the isolation tree of the isolation tree of the machine learning model A (137).

The velocity anomaly model (141) determines if there is an anomaly from features (rates and ratios) calculated from the training request stream (142) and the training decision stream (149). The velocity anomaly model (141) includes the machine learning model B (151) and receives input as the training request stream (142) and the training decision stream (149).

The training request stream (142) includes information about multiple requests over a finite period of time. The training request stream (142) is split into the training resource stream (143), the training subject stream (145), and the training pair stream (147). The training resource stream (143) includes information from the training request stream (142) about the resources being requested in the requests from the training request stream (142). The training subject stream (145) includes information from the training request stream (142) about the subjects issuing the requests in the training request stream (142). The training pair stream (147) pairs the subjects with the requests from the training request stream (142).

The training resource rate (144) is calculated from the training resource stream (143) to identify how often a resource is requested over a threshold time interval (2 seconds, 20 seconds, 10 minutes, 1 hour, etc.). For a training request being analyzed by the velocity anomaly model (141), the training resource rate (144) is for the resource identified by the training request and may identify the number of times the resource was requested by any subject.

The training subject rate (146) is calculated from the training subject stream (145) to identify how often a subject makes a request over a threshold interval of time. For a training request being analyzed by the velocity anomaly model (141), the training subject rate (146) is for the subject identified by the training request as requesting the resource and may identify the number of times the subject requested by any resource.

The training pair rate (148) is calculated from the training pair stream (147) to identify how often a subject resource pair occurs in a request over a threshold time interval. For a training request being analyzed by the velocity anomaly model (141), the training pair rate (148) is for the subject resource pair identified by the training request as requesting the resource and may identify the number of times a particular subject requested a particular resource.

The decision training decision stream (149) includes the decisions that were made on the requests in the training request stream (142). The training decision ratio (150) is calculated from the training decision stream (149) to identify a ratio between the number of decisions permitted and the number of decisions denied. For a training request being analyzed by the velocity anomaly model (141), training decision ratio (150) may be decisions for the pair of subject and resource. Additional embodiments may have decision ratios for the resource (requested by any subject) and the subject (requesting any resource).

The machine learning model B (151) generates the training velocity anomaly score (153) from the training resource rate (144), the training subject rate (146), the training pair rate (148), and the training decision ratio (150). The update function C (152) updates the machine learning model B (151) and may use backpropagation to update weights in the machine learning model B (151). For example, the machine learning model B (151) may use an isolation forest algorithm with the training resource rate (144), the training subject rate (146), the training pair rate (148), and the training decision ratio (150) being the inputs from which an isolation tree is constructed and the anomalous requests being identified by having path lengths closer to the minimum path length of the isolation tree than to the maximum path length of the isolation tree.

Turning to FIG. 1C, the prediction application (110) generates predictions using the machine learning models trained with the training application (114). The prediction application (110) includes the request anomaly model (130) and the velocity anomaly model (141), both of which were trained by the training application (114). The prediction application (110) is used by the system (100) to test live requests being received by the system without updating the underlying machine learning models.

The request anomaly model (130) receives the request data (160) and generates the request anomaly score (163). The vectorizer (132) generates the request vector (161) from the request data (160). The embedded encoder (134) generates the embedded vector (162) from the request vector (161). The machine learning model A (137) generates the request anomaly score (160) three from the embedded vector (162).

The velocity anomaly model (141) receives the request stream (170) and the decision stream (177) and generates the velocity anomaly score (179). The resource string (171), the subject stream (173), and pair stream (175) are extracted from the request stream (170). The resource rate (172) is extracted from the resource stream (171). The subject rate (174) is extracted from the subject stream (173). The pair rate (176) is extracted from the pair stream (175). The decision ratio (178) is extracted from the decision stream (177). The machine learning model B (151) generates the velocity anomaly score (179) from the resource rate (172), the subject rate (174), the pear rate (176), and the decision ratio (178).

Turning to FIG. 1D, the authorization application (103) authorizes the requests (180) received by the system (100). The authorization application (103) includes the authorization supervisor (104), the attribute supervisor (105), the policy analyzer (108), the attribute actor (106), and the policy engine actor (107).

The request (181) is one of the group of requests (180) received by the authorization application (103). The request (181) is handled by the authorization supervisor (104). The authorization supervisor (104) identifies the group of policies (182), which include the policy (183), that control authorization of the request (181). The authorization supervisor (104) uses the attribute supervisor (105) to identify the attributes needed to handle the policy (183).

The attribute supervisor (105) uses the policy analyzer (108) to identify the group of attributes (186), which include the attribute (185), that are needed in order to resolve the policy (183). The attribute supervisor (105) uses the attribute actor (106) to retrieve the attribute (185). The attribute supervisor (105) returns the group of attributes (186) to the authorization supervisor (104) for the policy (183).

The authorization supervisor (104) uses the policy engine actor (107) to evaluate the policies (182). The policy engine actor (107) uses the policy analyzer (108) to determine whether to permit or deny a request based on the policy (183) and the group of attributes (186).

The authorization supervisor (104) receives the decision on the policy (183) as well as the decisions for the other policies in the group of polices (182). In response to the decisions, the authorization supervisor (104) generates the response (195) for the request (181).

The responses (194) include the response (190), which includes the token (196). The token (192) may be used to access the resource controller (102) (shown in FIG. 1A).

Figure 2:
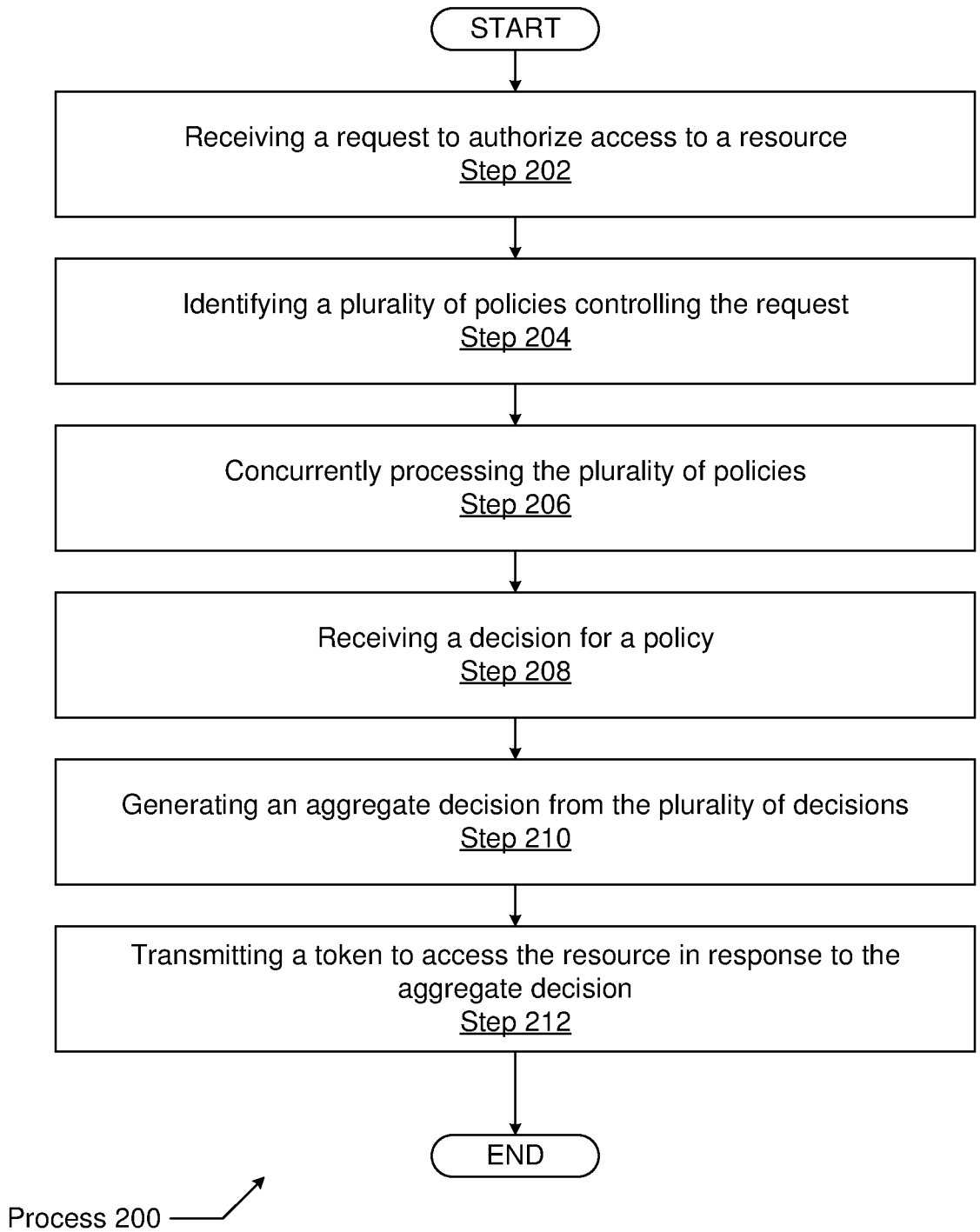
FIG. 2 shows a flowchart in accordance with disclosed embodiments.

FIG. 2 shows a flowchart of processes in accordance with the disclosure. The process (200) of FIG. 2 authorizes requests in a scalable manner. The embodiments of FIG. 2 may be combined and may include or be included within the features and embodiments described in the other figures of the application. The features of FIG. 2 are, individually and as an ordered combination, improvements to the technology of computing systems and machine learning systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

Turning to FIG. 2, the process (200) perform scalable request authorization. A request being processed by the system may identify a resource, a subject, an action, and an environment.

At Step 202, a request to authorize access to a resource is received. The request identifies the resource to which access is being requested, the subject requesting the access, the action to be performed on the resource, and the context for a request. The request may be received by a resource controller that is forwarded to an authorization supervisor.

At Step 204, a plurality of policies controlling the request are identified. Each quest may be linked to multiple policies that control whether or not the request will be permitted or denied. The policies linked to a request may be identified by the authorization supervisor using the information from the request.

At Step 206, the plurality of policies are concurrently processed. The policies may be concurrently processed by passing messages between the programs of the system. For each policy linked to a request, a message may be generated and sent to a queue of messages (i.e., an inbox) with each message being independently processed by the programs of the system. For example, processing the message for a first policy does not block processing the message of a second policy. In one embodiment, concurrently processing the requests includes: identifying a group of attribute resolvers for the policy, concurrently retrieving attributes using a group of attribute resolvers, and concurrently executing the plurality of policies to form the plurality of decisions.

At Step 208, a decision for a policy is received. The decision may be based on several attributes that are retrieved and checked by the system as specified by the policy. The attributes may identify a minimum user privilege level, a minimum time between accesses to a resource, a user authorization level, etc. The decision may be one of multiple decisions corresponding to multiple policies. The policy is one of the multiple policies being processed. The decision is determined using a machine learning model and the request.

As an example, a decision to permit a request may be received from a request anomaly model, which indicates that the request is not an anomalous request. Additionally, a velocity anomaly model may also indicate that the request is not an anomalous request.

At Step 210, an aggregate decision from the plurality of decisions is generated. Each policy may have a decision that forms part of the aggregated decision. In one embodiment, when one policy denies the request, the aggregated decision will also deny the request. In one embodiment, as a part of the decision process, one or more obligations may be identified and generated. An obligation is a task to be performed in order to perform the access requested by a request. An obligation may be executed by a user device or a server. Each policy and decision may identify multiple obligations to perform. As an example of an obligation, an obligation may require a user to have an escalated privilege level for a predetermined period of time in order to perform the requested access. The escalated perfect level may be performed by a server automatically or may be requested by the user device. The obligations for multiple policies of multiple requests may be executed concurrently in parallel.

At Step 212, a token to access the resource is transmitted in response to the aggregate decision. The token is transferred back to the resource controller which may transfer the token to a user device that requested access to the resource control by the resource controller. The token may allow access to the resource for a predetermined period of time (e.g., 10 seconds, 5 minutes, 2 hours, 1 day, etc.). The resource may be securely accessed using the token after the token is sent to the user device.

In one embodiment, the machine learning model includes a request anomaly model. A request vector may be generated from request data of the request by a vectorizer of the request anomaly model. An embedded vector may be generated from the request vector by an embedding encoder of the request anomaly model. A request anomaly score may be generated from the embedded vector by a machine learning model using an isolation forest algorithm. The request anomaly model may be trained using training request data.

In one embodiment, the machine learning model includes a velocity anomaly model. A resource rate may be generated from a resource stream from a request stream that includes the request being analyzed by the velocity anomaly model. A subject rate may be generated from a subject stream from the request stream by the velocity anomaly model. A pair rate may be generated from a pair stream from the request stream. A decision ratio may be generated from a decision stream linked to the request stream by the velocity anomaly model. A velocity anomaly score may be generated from a request stream that included the request. The velocity anomaly model may be trained using training request data.

In one embodiment, the machine learning model comprises a request anomaly model and a velocity anomaly model. Determining the decision using both models may include generating a request anomaly score using the request anomaly model and generating a velocity anomaly score using the velocity anomaly model. The request anomaly score and the velocity anomaly score may be weighted and combined to generate the decision on whether to permit the request.

Figure 3:
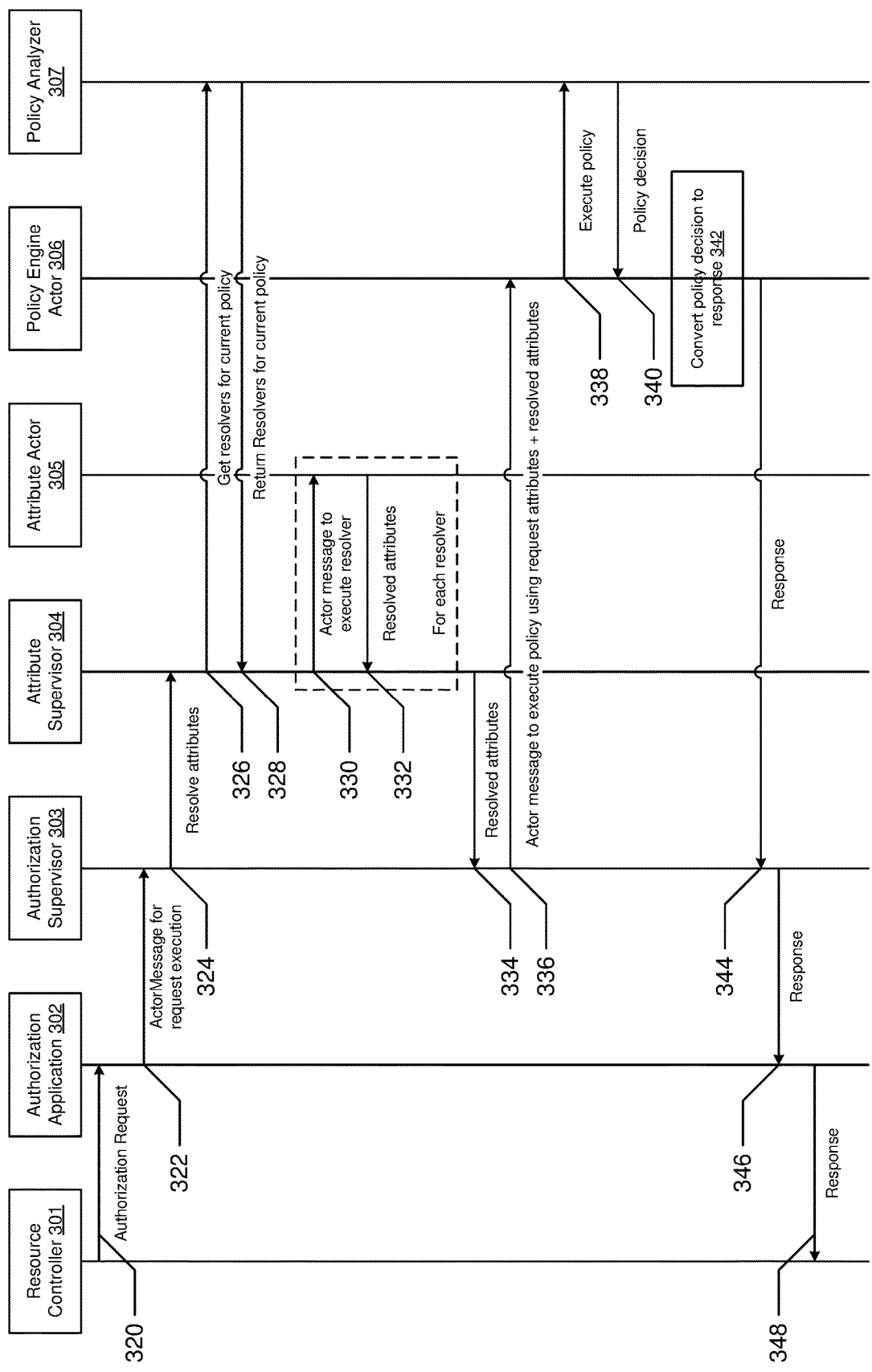
FIG. 3, FIG. 4A, FIG. 4B, and FIG. 4C show examples in accordance with disclosed embodiments.
Figure 4A:
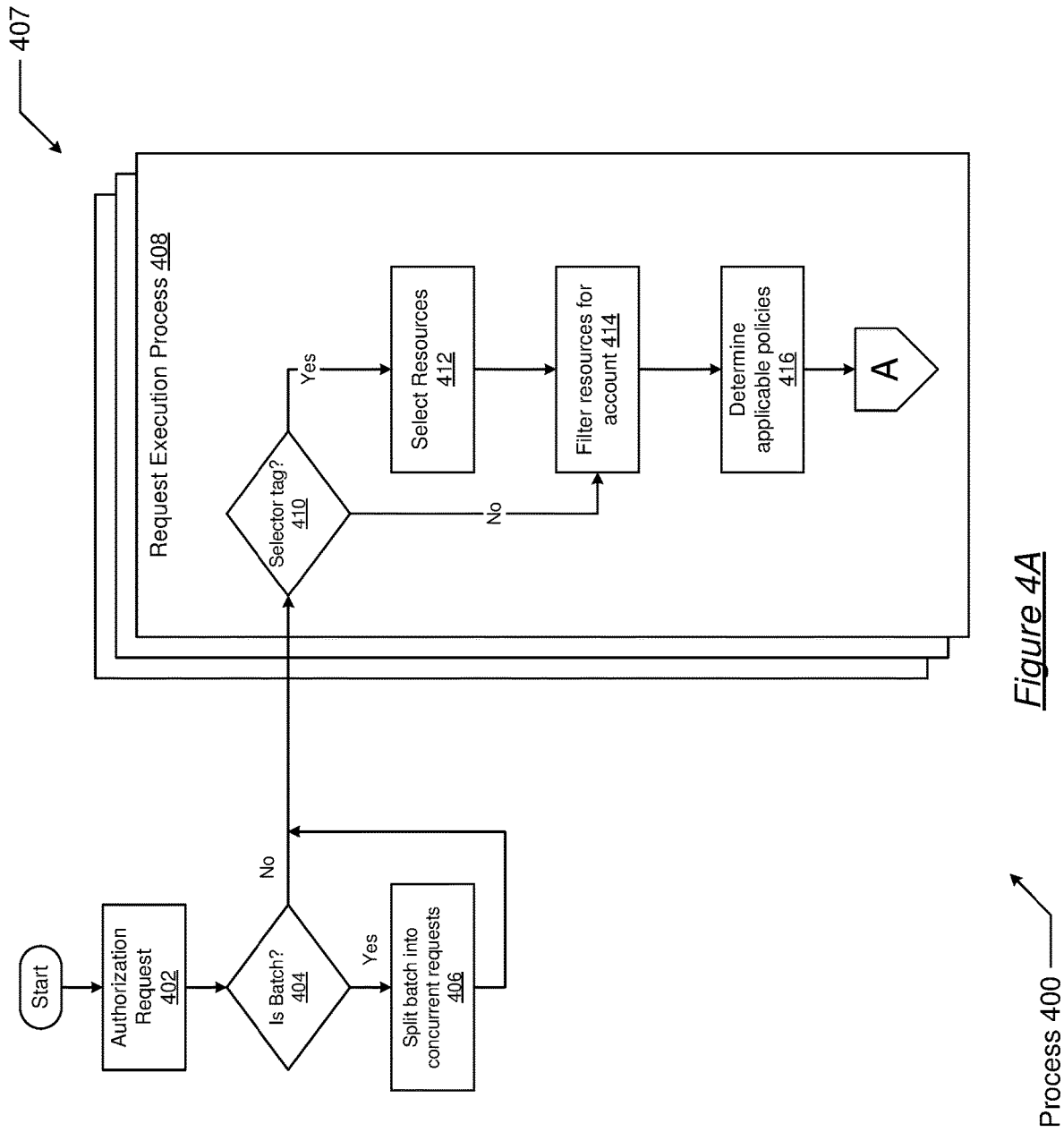
Figure 4B:
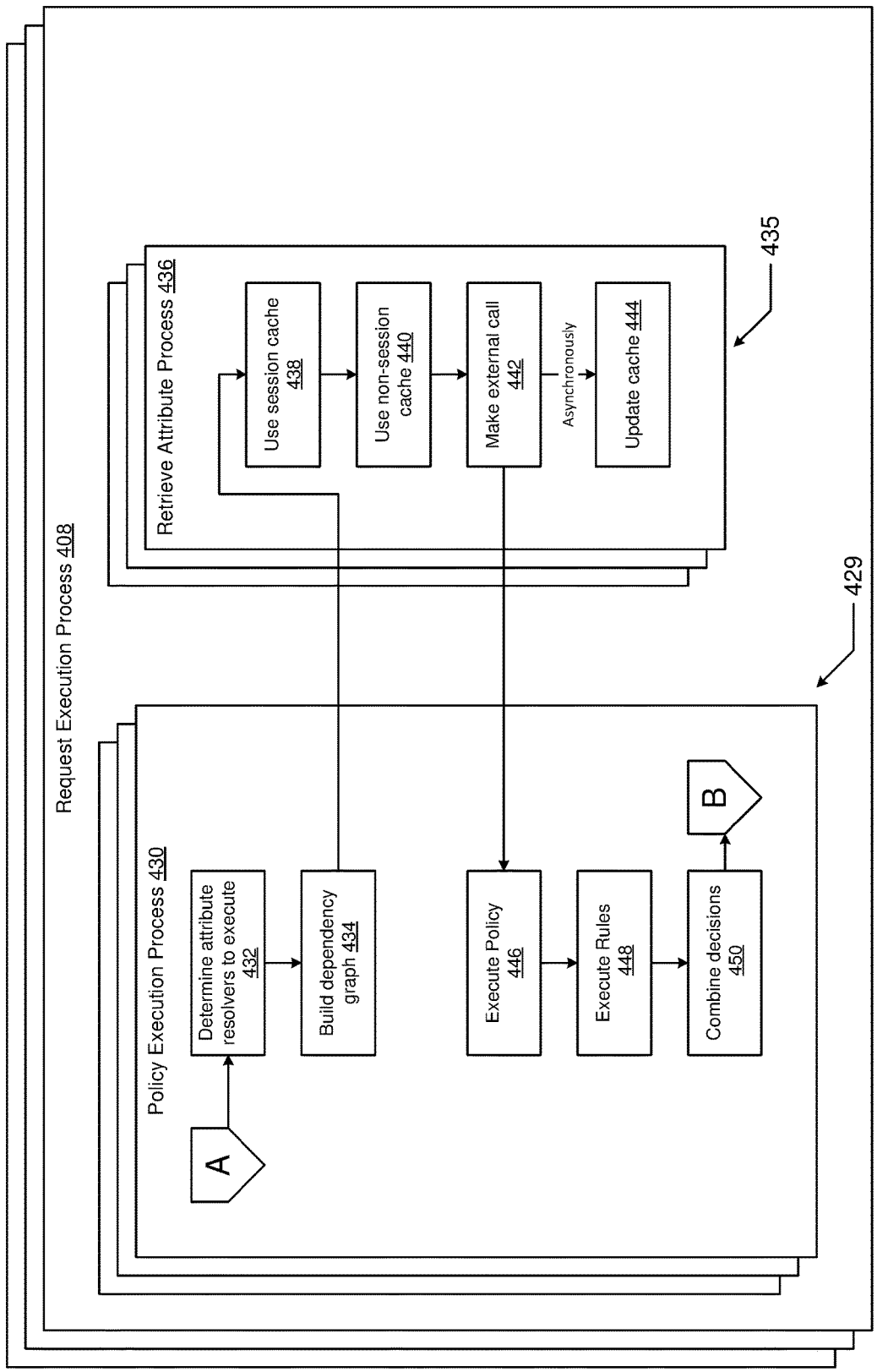
Figure 4C:
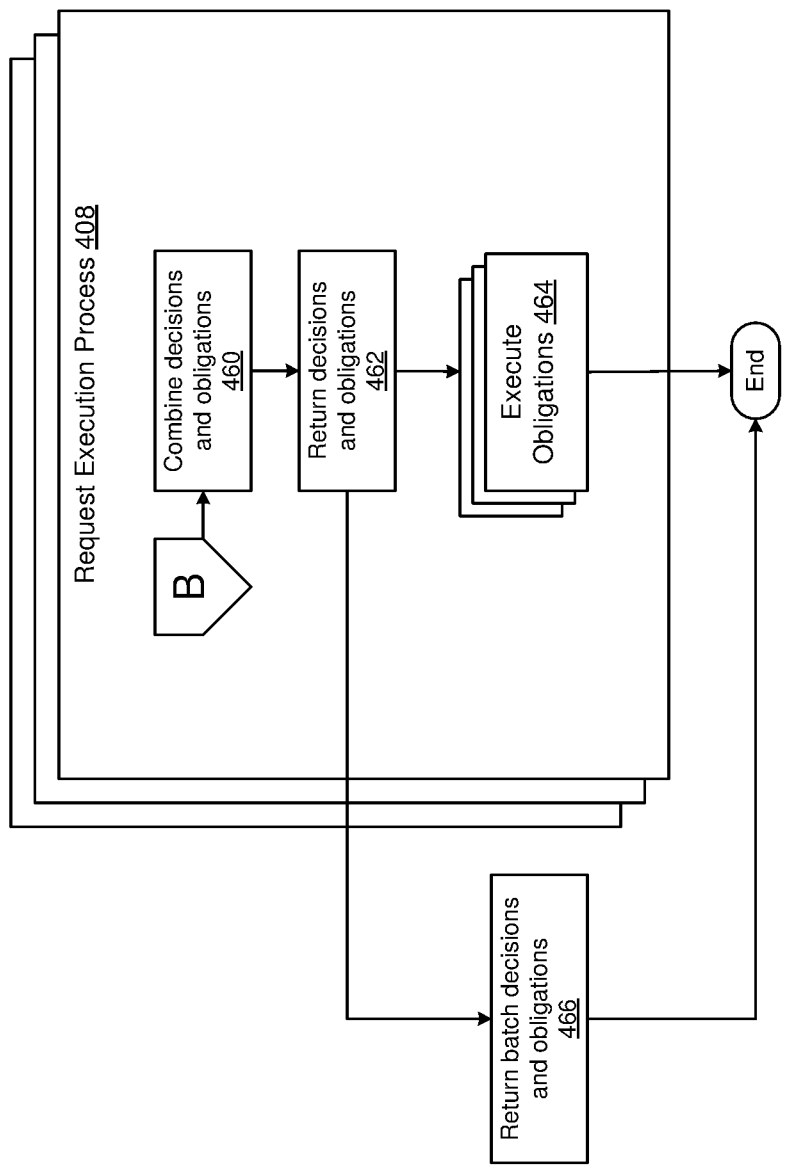

FIGS. 3, 4A, 4B, and 4C show examples of sequences and systems in accordance with the disclosure. FIG. 3 shows the sequence (300) that authorizes requests. FIGS. 4A through 4C show examples of processes that execute policies and retrieve attributes. The embodiments of FIGS. 3, 4A, 4B, and 4C may be combined and may include or be included within the features and embodiments described in the other figures of the application. The features and elements of FIGS. 3, 4A, 4B, and 4C are, individually and as a combination, improvements to the technology of computing systems and machine learning systems. The various features, elements, widgets, components, and interfaces shown in FIGS. 3, 4A, 4B, and 4C may be omitted, repeated, combined, and/or altered as shown. Accordingly, the scope of the present disclosure should not be considered limited to the specific arrangements shown in FIGS. 3, 4A, 4B, and 4C.

Turning to FIG. 3, the sequence (300) performs scalable request authorization. The sequence (300) is performed with the resource controller (301), the authorization application at (302), the authorization supervisor (303), the attribute supervisor (304), the attribute actor (305), the policy engine actor (306), and the policy analyzer (307).

At Step 320, the resource controller (301) sends an authorization request to the authorization application (302). The request is received from a client device to access a resource that is controlled by the resource controller.

At Step 322, a message is sent from the authorization application (302) to the authorization supervisor (303) to process the request from the resource controller (301). Each request received by the authorization application (302) may trigger a message being sent to the authorization supervisor (303) to process a request.

At Step 324, a message is sent from the authorization supervisor (303) to the attribute supervisor (304) to resolve the attributes for a policy from the request. The authorization supervisor (303) may identify each of the policies related to the request received, by the authorization supervisor (303), from the authorization application (302). After identifying the policies, the authorization supervisor (304) may send a message to the attribute supervisor (304) for each of the policies that were identified for the attribute supervisor (304) to identify, retrieve, and return the attributes related to the policies.

At Step 326, a message is sent from the attribute supervisor (304) to the policy analyzer (307) to get the attribute resolvers for a current policy that is being analyzed by the attribute supervisor (304). The message to the policy analyzer (307) from the attribute supervisor (304) requests retrieval of the attribute resolvers that are to be used to retrieve the attributes for the policy being processed by the attribute supervisor (304).

At Step 328, the policy analyzer (307) returns the attribute resolvers for the policy being analyzed by the attribute supervisor (304). The attribute resolvers may be in the form of a JSON (JavaScript object notation) file.

At Step 330, the attribute supervisor (304) sends a message that is received by the attribute actor (304) to execute a resolve and retrieve an attribute. The message includes one of the attribute resolvers received by the attribute supervisor (304) from the policy analyzer (307). Separate individual messages may be passed to multiple concurrently processing attribute actors (305) for each of the attributes (and corresponding attribute resolvers) used to process a policy by the attribute supervisor (304).

At Step 332 resolved attributes are returned from the attribute actor (305) to the attribute supervisor (304). The attribute actor (305) may execute commands with information from the attribute resolver to retrieve data from the system that provides the values for the attributes for a policy.

The Steps (330) and (332) may be repeated for each attribute resolver used by the attribute supervisor (304) to analyze the current policy. Each attribute resolver may also return multiple attributes.

At Step 334, the resolved attributes received by the attribute supervisor (304) are transmitted from the attribute supervisor (304) and received by the authorization supervisor (303). Multiple attributes may be received from each of multiple attribute actors (305) by the attribute supervisor (304).

At Step 336, a message is sent from the authorization supervisor (303) that is received by the policy engine actor (306) to execute a policy using the resolved attributes in addition to attributes that were included with the request received by the resource controller (301). Multiple messages may be sent out from the authorization supervisor (303) with one policy per each message along with the relevant attributes for the policy.

At Step 338, the policy engine actor (306) executes a policy using the policy analyzer (307). A single policy engine actor (306) may execute a single policy and multiple policy engine actors (306) may be instantiated concurrently to process multiple policies concurrently. The policies are executed by applying the rules of the policies to the attributes resolved for those policies. As an example, a rule may identify a certain privilege level to perform a specific action by an individual user and the attribute may identify the present privilege level of a user for an action. If the privilege level of the user does not satisfy the privileged level for the rule, the system may deny the request, or the system may allow the request with an obligation to increase the user privilege level to the minimum sufficient privilege level for a predetermined period of time.

At Step 340, after generating a decision on the policy, the policy analyzer (307) transmits a decision on the policy that is received by the policy engine actor (306). The decision may be an aggregation of multiple decisions from multiple policies using multiple attributes. The decision may deny the request, permit the request, deny the request with obligations, or permit the request with obligations. If the request is denied with obligations, the obligations may lock the resource from being used by the user or by other users and may lock the user from accessing the resource or other resources. If the request is permitted with obligations, the obligations may include a task to increase the privilege level of the user.

At Step 342, the policy engine actor (306) converts the policy decision to a response. The response may identify the outcome (e.g., permit or deny) of the decision and identify obligations that have been triggered in response to the request for access.

At Step 344, the response is passed from the policy engine actor (306) two the authorization supervisor (303). At Step 346, the response is passed from the authorization supervisor (303) to the authorization application (302). At Step 348, the response is passed from the authorization application (302) to the resource controller (301). In one embodiment, an obligation generated in response to executing a policy identifies parameters of a token to be used performing the access that was requested. The parameters of the token may specify the length of time the token may be used. In one embodiment, the resource controller (301) generates the token for accessing the resource and then transmits the token back to the user device that requested access.

Turning to FIGS. 4A, 4B, and 4C, the process (400) performs scalable request authorization. At Step 402, an authorization request is received. The authorization request may be received from a user device by a resource controller with the authorization request requesting access to a resource controlled by the resource controller. As an example, the request may include the following JSON text:

```
{
  "subject": {
    "content-length": "0",
    "company_originatingip": "70.42.250.251",
    "x-b3-parentspanid": "67b96ef780f02718",
    "agentId": "9*******",
    "x-b3-sampled": "1",
    "userIdPseudonym": "12***************",
    "x-forwarded-port": "443",
    "company_assetalias": "company.example",
    "company_appid": "Company.example",
    "company_accountid": "5*******",
    "companyId": "9*******",
    "identityAssuranceLevel": "-1",
    "host": "api.company.com",
    "x-rootspanid": "d2d4305a-4236-4d5f-9a2f-27627acca640",
    "content-type": "application/json",
    "company_token": "*********",
    "authnLevel": "25",
    "gateway_nginx_server_uri": "/v1/sp/OpenID-Company.smallbusiness.ipp.bill.com/linked_users",
    "x-forwarded-proto": "https",
    "company_token_type": "IAM-Ticket",
    "company_assetid": "2**************",
    "company_offeringid": "Company.example",
    "company_tid": "1-5f97a6ba-3ca158750ce129503415fbd8",
    "x-forwarded-for": "52.89.167.112, 52.43.191.244, 52.43.191.243, 100.111.39.128",
    "gateway_nginx_server_port": "443",
    "company_userid": "6***************",
    "accept": "application/json",
    "x-real-ip": "100.111.39.128",
    "x-amzn-trace-id": "Self\u003d1-5f97a6ba-45d9d79d32edc156085c6a37;Root\u003d1-5f97a6ba-186fd8e7270d70ee04485f3e",
    "singularityheader": "appId\u003d105*ctrlguid\u003d1598688208*acctguid\u003d7a1601f5-8dd7-4643-a3b6-efec7482015f*ts\u003d1603774138074*btid\u003d19953*guid\u003d33d049b4-cb0f-409f-a277-e24e2fc192b5*exitguid\u003d7*unresolvedexitid\u003d404640*cidfrom\u003d1951487*etypeorder\u003dHTTP*esubtype\u003dHTTP*cidto\u003d1951522",
    "x-b3-spanid": "6cd71ed52dd2b1d7",
    "x-b3-traceid": "67b96ef780f02718",
    "namespaceId": "5*******",
    "x-parentspanid": "5815d31a-45de-4933-99ed-5a55bc0e9211:1",
    "company_app_name": "company.example",
    "company_clientcontext": "*******",
    "company_originalurl": "https://example.com/v1/sp/OpenID-Company.example.ipp.bill.com/linked_users",
    "x-forwarded-for-gateway": "52.89.167.112, 52.43.191.244",
    "accept-encoding": "gzip, deflate"
  },
  "resource": {
    "id-opaUrl": "Company/example/policy",
    "originalRequestURI": "/v1/sp/{serviceProviderId}/linked_users",
    "requestURI": "/example/v1/sp/OpenID-Company.example.com/linked_users",
    "id": "Company.example",
    "PartnerId": "OpenID-Company.example.com",
    "httpMethod": "POST"
  },
  "environment": {
    "connectingEnvironment": "production",
    "createTime": "2020-10-26 21:47:55 PDT",
    "expirationTime": "2020-10-26 21:57:55 PDT",
    "authz_workflow_id": "d8a93431-6df7-48a0-bea8-e70b82649eeb",
    "authTime": "2020-10-26 21:47:54 PDT",
    "ticketId": "9ac65aff-242a-41d3-90ea-427690db75e7"
  }
}
```

At Step 404, it is determined whether the authorization request is part of a batch request. When the request is part of a batch request, the process (400) proceeds to Step 406. When the request is not part of a batch, the process (400) proceeds to Step 410 in the request execution process (408). The request execution processes (408) is one of the request execution processes (407). Each request that is received may be handled by an individual one of the request execution processes (407). Multiple request execution processes (407) may be instantiated to concurrently process multiple authorization requests.

At Step 406, the batch is split into multiple requests that may be concurrently processed by the system and proceeds to the Step 410. The requests may be sent to a queue from which the request execution process is (407) may handle the requests.

At Step 410, it is determined if the request being processed by the request execution process (408) includes a selector tag. The selector tag may identify a particular resource to be accessed using the request. The process (408) proceeds to Step 412 when a selector tag is present and proceeds to the Step 414 when a selector tag is not present.

At Step 412 resources are selected. A call may be made using the resource specified in the tag. For example, tag below identifies the resource as being "GoPaymentMobileFeatureSet".
selector="GoPaymentMobileFeatureSet"

At Step 414, the resources are filtered for an account. The account is identified in the request that was received by the system and the resources are filtered by the account to pull the data from those resources that are linked to the account. For example, with the account "accountID-1(234)", the filtering is applied to the resources to which the account has access, e.g., the resources of Product Catalog, Grants, Entitlements, Preference. Each of these resources may be a table within a database.

At Step 416 the applicable policies are determined for the request being executed with the request execution process (408). The polices may include policy groups and generic policies, e.g., the policies of cross-account, account protection, financial documents, all resource policy, etc.

For each policy, a policy execution process (shown in FIG. 4B) is performed. The policy execution processes (430) are non blocking and may be performed concurrently by passing messages to a queue from which the policy execution processes (429) may execute the policies.

Turning to FIG. 4B, the policy execution process (430) is one of the policy execution processes (429). The policy execution processes (429) execute the policies for the request being processed with the request execution process (408).

At Step 432 of the policy execution process (430), the attribute resolvers to be executed for a policy are determined. The attribute resolvers may be determined by a policy analyzer that may retrieve a mapping between the policies, the attributes used for the policies, and the attribute resolvers used to retrieve the attributes for the policies.

At Step 434, a dependency graph is built. The dependency graph identifies each of the attributes to be resolved. Different policies may use the same or similar attributes and building the dependency graph may reduce the number of calls to retrieve data for attributes by preventing duplicate calls for the same attribute.

For each attribute, an attribute process is performed. The retrieve attribute process (436) is one of multiple retrieve attribute processes that are used by the policy execution process (430). After building the dependency graph, the policy execution process (430) triggers the retrieve attribute processes (435) to execute the approval process for the attributes required for the policy being handled with the policy execution process (430). The retrieve attribute processes (435) include the retrieve attribute process (436), which may retrieve one attribute for the policy execution request (430).

At Step 438, the session cache is used to retrieve an attribute that is stored in the session cache. The retrieve attribute process (436) checks the session cache to identify if the attribute is presently stored in the session cache.

At Step 440, a non session cache is used to retrieve an attribute that is stored in the non session cache. When the attribute was not stored in the session cache, the retrieve process (436) checks the non-session cache to identify if the attribute is presently stored in the non-session cache.

At Step 442, an external call is made to retrieve the attribute from an external memory. When the attribute was not stored in the session cache and not stored in the non-session cache, the retrieve process (436) makes the external call.

After retrieving the attribute (from either the session cache, the non-session cache, or from external memory), the retrieve attribute process (436) returns the value of the attribute to the policy execution process (430) at Step 446.

At Step 444, the retrieve attribute process (436) asynchronously updates at least one of the session cache and the non-session cache with the attribute that a was retrieved using the external call to reduce the time taken to retrieve the attribute by future requests. The session cache may be a cache for the web session used by the request being processed by the system. The session cache may store information unique to a particular user, and the non session cache may store information that is generic between multiple users.

At Step 446, the policy is executed. The policy is executed after retrieving the attributes with the retrieve attribute processes (435). The policy being executed may include multiple rules.

At Step 448, the rules of the policy are executed. The rules may be applied to the values of the attributes that were retrieved with the retrieve attribute processes (435) to identify whether the request will be permitted or denied based on the policy executed with the policy execution process (430).

At Step 450, the decisions from the rules of the policy are combined. In one embodiment, each rule of a policy must be satisfied for the policy to permit the request. The policy execution process (430) then returns to the request execution process (408) Step 460 shown in FIG. 4C.

Turning to FIG. 4C, at Step 460, the decisions of multiple policies are combined and obligations are identified. Each policy must permit the request for the request to ultimately be permitted. Each policy may include multiple obligations that must be satisfied for a request.

At Step 462, the decisions and obligations are returned to the process that called the request execution process (408). The obligations may be performed by either the device that requested access or the device that is controlling access to the resource. The obligations for a device requesting access are returned to the device requesting access with the result of the decision for the policies linked to the request processed by the request execution process (408).

At Step 464, obligations are executed by the request execution process (408). Multiple obligations may be executed concurrently.

At Step 466, a batch of decisions and obligations are returned response to the requests received by the system.

The return may also include one or more tokens that are used to access the requested resource. In order for the system requesting access to access the resource, the obligations are performed prior to using the tokens.

Embodiments of the invention may be implemented on a computing system. Any combination of a mobile, a desktop, a server, a router, a switch, an embedded device, or other types of hardware may be used. For example, as shown in FIG. 5A, the computing system (500) may include one or more computer processor(s) (502), non-persistent storage (504) (e.g., volatile memory, such as a random access memory (RAM), cache memory), persistent storage (506) (e.g., a hard disk, an optical drive such as a compact disk (CD) drive or a digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) (502) may be one or more cores or micro-cores of a processor. The computing system (500) may also include one or more input device(s) (510), such as a touchscreen, a keyboard, a mouse, a microphone, a touchpad, an electronic pen, or any other type of input device.

The communication interface (512) may include an integrated circuit for connecting the computing system (500) to a network (not shown) (e.g., a local area network (LAN), a wide area network (WAN) such as the Internet, a mobile network, or any other type of network) and/or to another device, such as another computing device.

Further, the computing system (500) may include one or more output device(s) (508), such as a screen (e.g., a liquid crystal display (LCD), a plasma display, a touchscreen, a cathode ray tube (CRT) monitor, a projector, or other display device), a printer, an external storage, or any other output device. One or more of the output device(s) (508) may be the same or different from the input device(s) (510). The input and output device(s) (510 and 508) may be locally or remotely connected to the computer processor(s) (502), non-persistent storage (504), and persistent storage (506). Many different types of computing systems exist, and the aforementioned input and output device(s) (510 and 508) may take other forms.

Software instructions in the form of computer readable program code to perform embodiments of the invention may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system (500) shown in FIG. 5A, or a group of nodes combined may correspond to the computing system (500) shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system (500) shown in FIG. 5A. Further, the client device (526) may include and/or perform all or a portion of one or more embodiments of the invention.

The computing system (500) or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (500) in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system (500) of FIG. 5A, while performing one or more embodiments of the invention, may perform data comparison. Data comparison may be used to compare two or more data values (e.g., A, B). For example, one or more embodiments may determine whether $A>B$, $A=B$, $A\,!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (500) in FIG. 5A may implement and/or be connected to a data repository. For example, one type of data repository is a database. A database is a collection of information configured for ease of data retrieval, modification, re-organization, and deletion. A Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (500) of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (500) of FIG. 5A and the nodes (e.g., node X (522), node Y (524)) and/or client device (526) in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   receiving a request to authorize access to a resource;
   identifying a plurality of policies controlling the request to authorize access;
   concurrently processing the plurality of policies;
   determining a plurality of decisions corresponding to a plurality of policies, wherein determining each decision in the plurality of decisions for each policy in the plurality of policies comprises:
     processing, with a machine learning model, the request to authorize access, wherein the machine learning model comprises a request anomaly model and a velocity anomaly model, and wherein processing comprises:
       generating a request vector from the request to authorize access,
       generating an embedded vector from the request vector, the embedded vector comprising fewer dimensions than the request vector,
       applying the request anomaly model to the embedded vector to generate a request anomaly score,
       applying the velocity anomaly model to information about requests over time that are similar to the request to authorize to generate a velocity anomaly score,
       combining the request anomaly score with the velocity anomaly score to generate a combined score, and
       generating the decision for the policy from the combined score;
   generating an aggregate decision from the plurality of decisions; and
   transmitting a token to access the resource in response to the aggregate decision.

2. The method of claim 1, wherein, with respect to the velocity anomaly model, the method further comprises:
   generating a resource rate from a resource stream from a request stream comprising the request;
   generating a subject rate from a subject stream from the request stream;
   generating a pair rate from a pair stream from the request stream;
   generating a decision ratio from a decision stream linked to the request stream; and
   generating the velocity anomaly score from a request stream comprising the request.

3. The method of claim 1, further comprising:
   training the request anomaly model using training request data.

4. The method of claim 1, further comprising:
   training the velocity anomaly model using a training request stream and a training decision stream.

5. The method of claim 1, wherein the request identifies a resource, a subject, an action, and an environment.

6. The method of claim 1, wherein concurrently processing the plurality of policies comprises:
   identifying a group of attribute resolvers for the policy;
   concurrently retrieving attributes using the group of attribute resolvers; and
   concurrently executing the plurality of policies to form the plurality of decisions.

23

7. The method of claim 1, further comprising:
concurrently executing a group of obligations generated from executing the plurality of policies.

8. The method of claim 1, wherein responsive to the token being transmitted, the resource is securely accessed using the token.

9. A system comprising:
a server comprising one or more processors and one or more memories; and
an authorization application, executing on one or more processors of the server, configured for:
receiving a request to authorize access to a resource;
identifying a plurality of policies controlling the request to authorize access;
concurrently processing the plurality of policies;
determining a plurality of decisions corresponding to a plurality of policies, wherein, determining each decision in the plurality of decisions for each policy in the plurality of policies comprises:
processing, with a machine learning model, the request to authorize access, wherein the machine learning model comprises a request anomaly model and a velocity anomaly model, and wherein processing comprises:
generating a request vector from the request to authorize access,
generating an embedded vector from the request vector, the embedded vector comprising fewer dimensions than the request vector,
applying the request anomaly model to the embedded vector to generate a request anomaly score,
applying the velocity anomaly model to information about requests over time that are similar to the request to authorize to generate a velocity anomaly score,
combining the request anomaly score with the velocity anomaly score to generate a combined score, and
generating the decision for the policy from the combined score;
generating an aggregate decision from the plurality of decisions; and
transmitting a token to access the resource in response to the aggregate decision.

10. The system of claim 9, wherein, with respect to the velocity anomaly model, the authorization application is further configured for:
generating a resource rate from a resource stream from a request stream comprising the request;
generating a subject rate from a subject stream from the request stream;
generating a pair rate from a pair stream from the request stream;
generating a decision ratio from a decision stream linked to the request stream; and
generating the velocity anomaly score from a request stream comprising the request.

24

11. The system of claim 9, wherein the authorization application is further for:
training the request anomaly model using training request data.

12. The system of claim 9, wherein the authorization application is further for:
training the velocity anomaly model using a training request stream and a training decision stream.

13. The system of claim 9, wherein the request identifies a resource, a subject, an action, and an environment.

14. The system of claim 9, wherein concurrently processing the plurality of policies comprises:
identifying a group of attribute resolvers for the policy;
concurrently retrieving attributes using the group of attribute resolvers; and
concurrently executing the plurality of policies to form the plurality of decisions.

15. The system of claim 9, wherein the authorization application is further configured for:
concurrently executing a group of obligations generated from executing the plurality of policies.

16. A method comprising:
training, using training request data, a request anomaly model of a machine learning model;
training, using a training request stream and a training decision stream, a velocity anomaly model of the machine learning model;
receiving a request to authorize access to a resource;
identifying a plurality of policies controlling the request to authorize access;
concurrently processing the plurality of policies;
determining a plurality of decisions corresponding to a plurality of policies, wherein, determining each decision in the plurality of decisions for each policy in the plurality of policies comprises:
processing, with the machine learning model, the request to authorize access, wherein the machine learning model comprises the request anomaly model and the velocity anomaly model, and wherein processing comprises:
generating a request vector from the request to authorize access,
generating an embedded vector from the request vector, the embedded vector comprising fewer dimensions than the request vector,
applying the request anomaly model to the embedded vector to generate a request anomaly score,
applying the velocity anomaly model to information about requests over time that are similar to the request to authorize to generate a velocity anomaly score,
combining the request anomaly score with the velocity anomaly score to generate a combined score, and
generating the decision for the policy from the combined score;
generating an aggregate decision from the plurality of decisions; and
transmitting a token to access the resource in response to the aggregate decision.

* * * * *